(12) United States Patent
Umberger et al.

(10) Patent No.: US 7,337,269 B2
(45) Date of Patent: Feb. 26, 2008

(54) METHOD OF MANAGING A DATA STORAGE ARRAY, AND A COMPUTER SYSTEM INCLUDING A RAID CONTROLLER

(75) Inventors: David Umberger, Boise, ID (US); Guillermo Navarro, Boise, ID (US)

(73) Assignee: Hewlett Packard Development Company, L.P., Ft. Collins, CO (US)

( * ) Notice: Subject to any disclaimer, the term of this patent is extended or adjusted under 35 U.S.C. 154(b) by 844 days.

(21) Appl. No.: 10/264,573

(22) Filed: Oct. 3, 2002

(65) Prior Publication Data

US 2004/0068609 A1 Apr. 8, 2004

(51) Int. Cl.
*G06F 12/00* (2006.01)
*G06F 12/02* (2006.01)

(52) U.S. Cl. ...................... 711/112; 711/114
(58) Field of Classification Search ............. 711/114, 711/112

See application file for complete search history.

(56) References Cited

U.S. PATENT DOCUMENTS

| | | | |
|---|---|---|---|
| 5,392,244 A | 2/1995 | Jacobson et al. | |
| 5,664,187 A * | 9/1997 | Burkes et al. | 707/205 |
| 5,666,512 A * | 9/1997 | Nelson et al. | 711/114 |
| 5,960,451 A | 9/1999 | Voigt et al. | |
| 6,230,240 B1 | 5/2001 | Shrader et al. | |
| 6,275,898 B1 * | 8/2001 | DeKoning | 711/114 |
| 6,426,530 B1 * | 7/2002 | Bertin et al. | 257/329 |

OTHER PUBLICATIONS

U.S. Patent Appn. filed Oct. 3, 2002, titled "Managing a Data Storage Array, A Data Storage System, and a RAID Controller", by David Umberger, Guillermo Navarro, and Rodger Daniels, (HE12-198).

U.S. Patent Appn. filed Oct. 3, 2002, titled "Computer Systems, Virtual Storage Systems and Virtual Storage System Operation Methods", by Michael Brent Jacobson and Lee L. Nelson, (HE12-200).

U.S. Patent Appn. filed Oct. 3, 2002, titled "Virtual Storage Systems, Virtual Storage Methods and Methods for Over Committing a Virtual RAID Storage System", by Michael Brent Jacobson and Lee L. Nelson, (HE12-201).

U.S. Patent Appn. filed Oct. 3, 2002, titled "Virtual Storage Systems and Virtual Storage System Operational Methods", by Rodger Daniels and Lee L. Nelson, (HE12-202).

U.S. Patent Appn. filed Oct. 3, 2002, titled "Virtual Storage Systems and Virtual Storage System Operational Methods", by Lee L. Nelson and Rodger Daniels, (HE12-203).

\* cited by examiner

*Primary Examiner*—Hong Kim
*Assistant Examiner*—Midys Rojas
(74) *Attorney, Agent, or Firm*—Wells St. John, P.S.

(57) ABSTRACT

A method of managing disk array includes providing a disk array and a RAID controller, receiving commands using the controller, accessing data within the array responsive to the commands, determining the amount of free space within the disk array, measuring a rate of data access; and selectively creating free space within the disk array responsive to the determining and the measuring. A computer disk system includes an array of computer disks, a RAID controller respectively coupled to the array and configured to access data within the array and to determine the amount of free space within the array, and a user interface coupled to the controller, wherein the controller is further configured to measure a rate at which the array is accessed and to selectively create free space within the array responsive to the determining and the measuring.

17 Claims, 3 Drawing Sheets

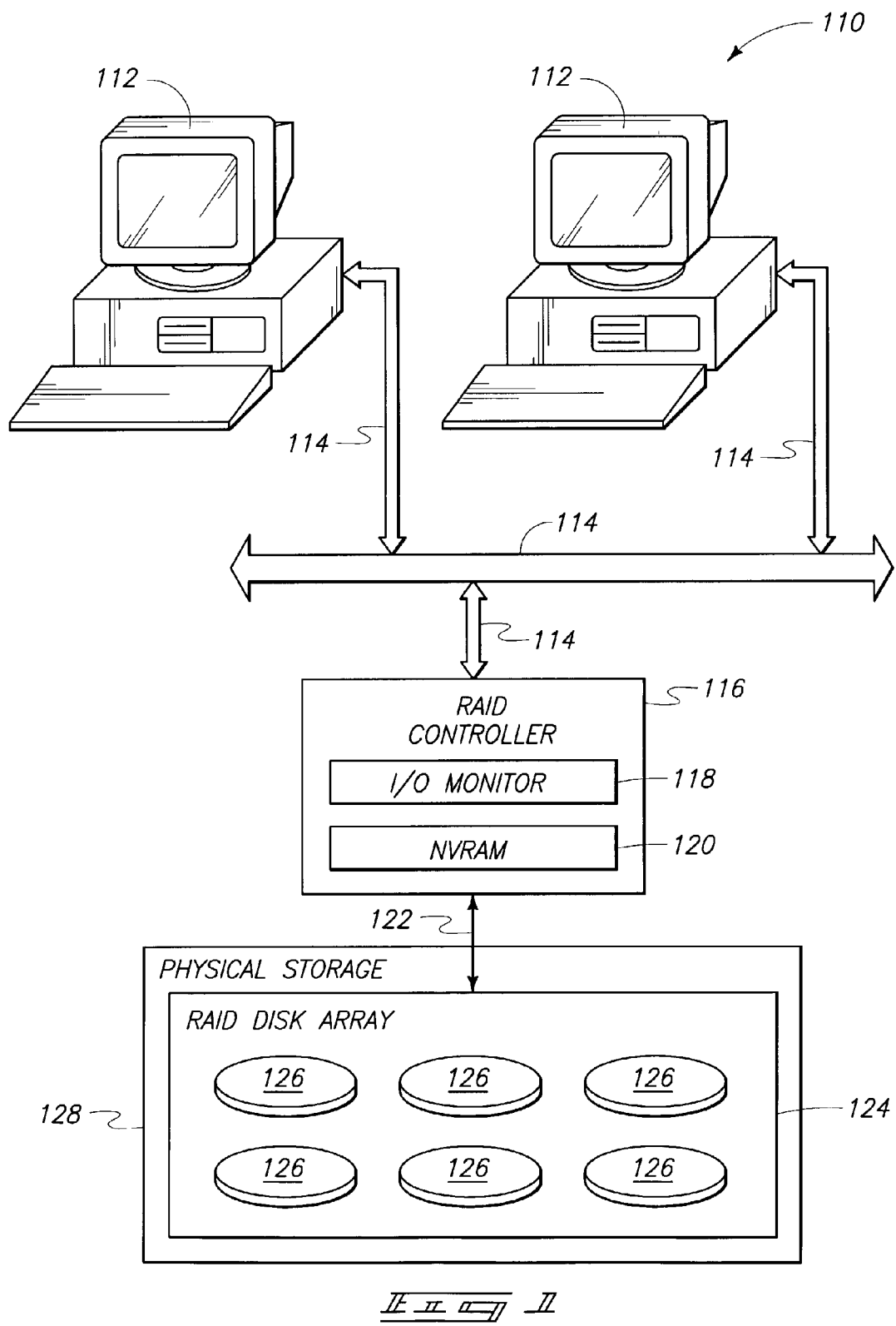

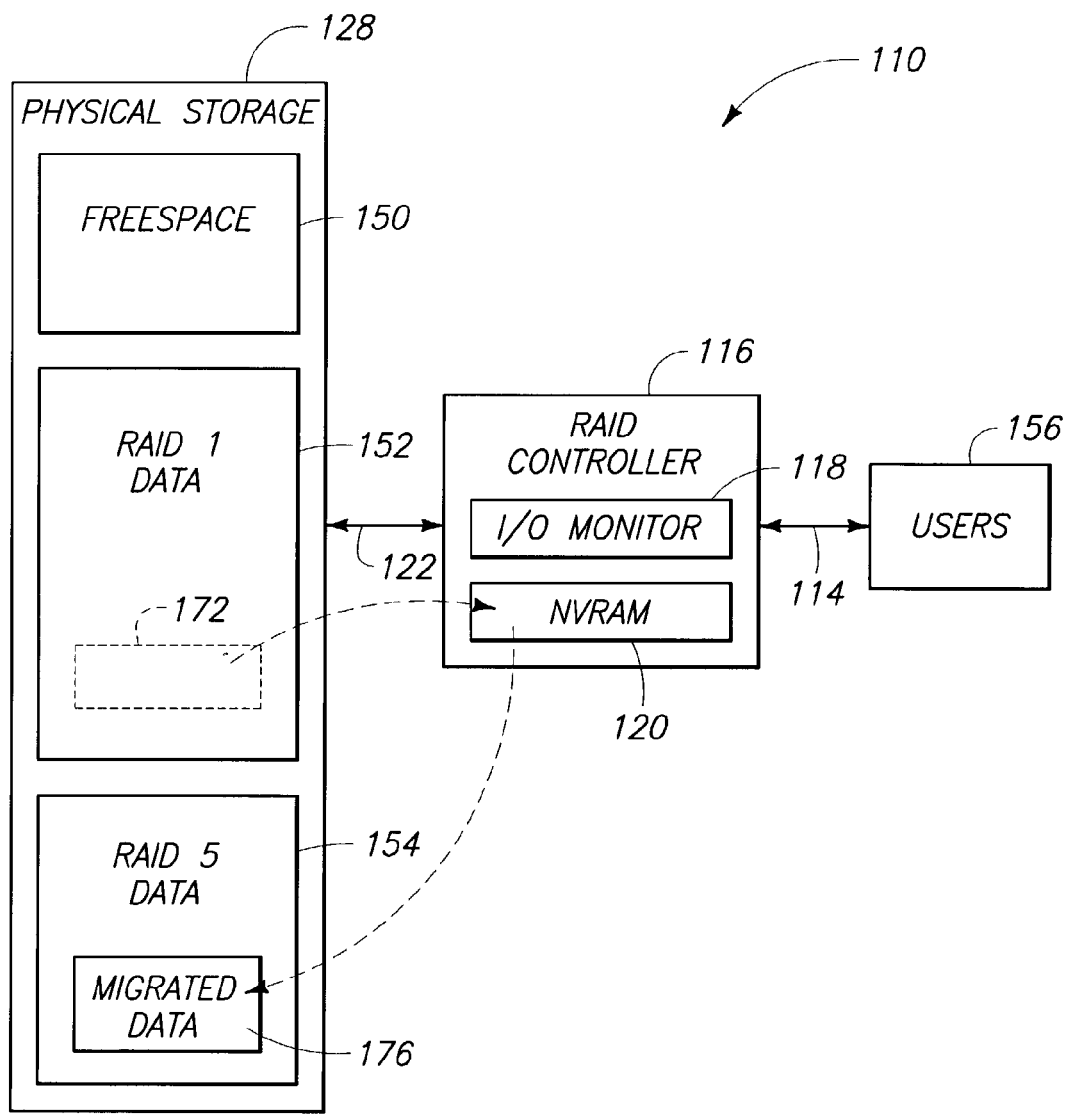

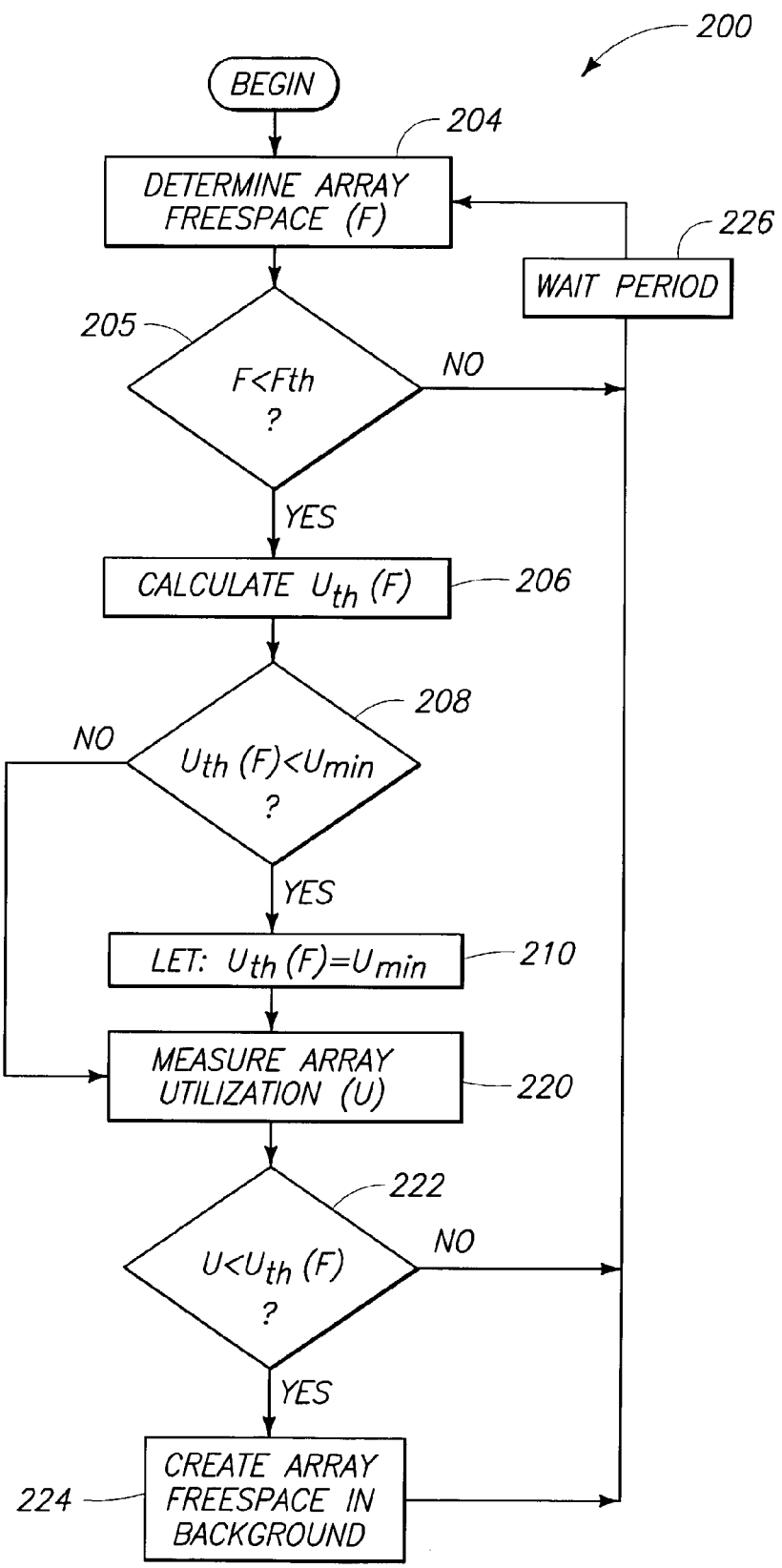

METHOD OF MANAGING A DATA STORAGE ARRAY, AND A COMPUTER SYSTEM INCLUDING A RAID CONTROLLER

FIELD OF THE INVENTION

The invention relates to systems and methods for control of an array of computer-accessible disks.

BACKGROUND OF THE INVENTION

The use of an array of disks for computer-based data storage is known in the art. One category of disk arrays is referred to as Redundant Array of Inexpensive Drives (RAID). Within a RAID system, varying levels of data storage redundancy are utilized to enable reconstruction of stored data in the event of data corruption or disk failure. These various types of redundant storage strategies are referred to as RAID levels. RAID data storage is discussed in detail in U.S. Pat. No. 5,392,244, which is incorporated herein by reference.

One RAID storage method involves storing two or more complete sets of the same data, with each complete data set stored on one or more different disks. This strategy is generally considered a 'high' RAID level (i.e., RAID level one), and provides relatively fast access to the stored data due to simultaneous reading of each data set, as well as complete reconstruction of a redundant data set in the event that one of the data sets is corrupted or otherwise damaged. Due to the complete redundancy of all stored data, this RAID level is relatively space-intensive (i.e., increased media count).

Another RAID storage method, usually considered a 'low' RAID level (i.e, RAID level five), is typically utilized when data storage space is at a premium, such as when a plurality of different data sets are being managed. This RAID level utilizes a parity data set to enable the reconstruction of a corrupted data set. This RAID level provides relatively efficient storage (i.e., reduced media count), but requires that reconstruction of a corrupted data set be performed before that data set may be accessed. Furthermore, since only a single instance of any given data set is stored, access is relatively slow compared to the higher RAID level described above (i.e., it is not possible to simultaneously access different parts the same data set).

Therefore, a RAID management system capable of optimizing RAID data types while ensuring future storage space is desired.

SUMMARY OF THE INVENTION

The invention provides a method of and system for automatically managing the use of different RAID levels within an array, such that free space within the array is created responsive to the present free space and the current rate of use.

One aspect of the invention provides a method of managing a disk array comprising providing a plurality of computer disks configured to store data, configuring the plurality of computer disks as a RAID array, coupling a controller to the RAID array, measuring a rate at which the array is accessed by a user, and selectively moving blocks of data within the RAID array such that free space is created within the RAID array responsive to the measuring using the controller.

Another aspect of the invention provides a method of managing a RAID disk array comprising providing a RAID disk array having a RAID controller, receiving a plurality of commands from a user using the controller, accessing data within the disk array responsive to the plurality of commands using the controller, determining the amount of free space within the disk array using the controller, measuring a rate of the accessing using the controller, and selectively creating free space within the disk array responsive to the determining and the measuring using the controller.

Another aspect of the invention provides a computer disk system comprising a plurality of computer disks configured as an array, a RAID controller respectively coupled to each of the computer disks within the array and configured to access data within the array and to determine the amount of free space within the array, and a user interface coupled to the controller, wherein the controller is further configured to measure a rate at which the array is accessed by way of the user interface and to selectively create free space within the array responsive to the determining and the measuring, and wherein the controller is further configured to create the free space by selectively moving blocks of data to different RAID levels within the array, and wherein the controller is further configured to access data within the array responsive to a command received by way of the user interface simultaneous with at least a portion of the creating the free space.

Yet another aspect of the invention provides a computer system comprising means for storing data, means for determining a quantity of free space within the storage means, means for reading and writing data within the storage means responsive to respective commands from a user, means for measuring a rate of the reading and writing the data by the user, and means for selectively moving the data within the storage means responsive to the determining and the measuring, such that free space is created within the storage means.

Still another aspect of the invention provides a data storage system comprising a plurality of data storage elements configured as an array, a RAID controller respectively coupled to each of the storage elements within the array and configured to selectively read data from and write data to the array and to determine the amount of free space within the array, and a user interface coupled to the controller and configured to selectively issue a plurality of different commands respectively reading data from and writing data to the array by way of the controller, wherein the controller is further configured to measure a rate at which the data is read from and written to the array by way of the user interface, and wherein the controller is further configured to create free space within the array from time to time responsive to the determining and the measuring, and wherein the creating the free space includes selectively moving blocks of data to different RAID levels within the array, and wherein the controller is further configured to read data from and write data to the array responsive to commands received by way of the user interface simultaneous with at least a portion of the creating the free space.

DESCRIPTION OF THE DRAWINGS

FIG. 1 is an illustration of interrelated elements of one possible embodiment of the present invention.

FIG. 2 is an block diagrammatic view of one possible embodiment of the present invention.

FIG. 3 is a flowchart of one possible embodiment of makespace process of the present invention.

DETAILED DESCRIPTION OF THE INVENTION

Attention is directed to the following commonly assigned applications, which are incorporated herein by reference.

U.S. patent application Ser. No. 10/264,915 (HE12-198) entitled "A System for Managing a Data Storage Array, a Method of Managing a Data Storage System, and a RAID Controller", by inventors David Umberger, Guillermo Navarro and Rodger Daniels; U.S. patent application Ser. No. 10/264,957 (HE12-200) entitled "Computer Systems, Virtual Storage Systems and Virtual Storage System Operational Methods", by inventors Michael Brent Jacobson and Lee L. Nelson; U.S. patent application Ser. No. 10/264,659 (HE12-201) entitled "Virtual Storage Systems, Virtual Storage Methods and Methods of Over Committing a Virtual RAID Storage System", by inventors Michael Brent Jacobson and Lee L. Nelson; U.S. patent application Ser. No. 10/264,525 (HE12-202) entitled "Virtual Storage Systems and Virtual Storage System Operational Methods", by inventors Rodger Daniels and Lee L. Nelson; and U.S. patent application Ser. No. 10/264,661 (HE12-203) entitled "Virtual Storage Systems and Virtual Storage System Operational Methods", by inventors Lee L. Nelson and Rodger Daniels.

FIG. 1 illustrates one possible embodiment of a RAID-based system 110 in accordance with one aspect of the invention. The system 110 includes user interface computers 112 respectively coupled in data communication with a RAID controller 116 by way of a network 114. The RAID controller 116 includes input/output monitoring (I/O monitor) circuitry 118 and memory, such as non-volatile random access memory (NVRAM) 120. Further included in system 110 is a RAID disk array 124 which is coupled in data communication with the controller 116 by way of a coupling 122. The disk array 124 includes a plurality of data storage disks 126, each being individually accessible by the controller 116. The disks 126 of the array 124 constitute the physical data storage 128 of system 110.

Referring now to FIG. 2, system 110 is depicted in block diagrammatic form. Physical storage 128 comprises free space (i.e., unused space) 150; data space 152; and data space 154. Data spaces 152 and 154 are utilized to store data in RAID levels one and five, respectively, and are defined and managed by the controller 116. Users 156 access the data within spaces 152 and 154 by way of commands sent to controller 116 through the use of interfaces 112 (not shown in FIG. 2).

For example, a user 156 may issue a command updating (i.e., changing) information within a block of data in space 154. The changes to be made are routed to controller 116 from a user computer 112 by way of the network 114. The controller 116 then determines what specific block of data in space 154 is to be altered and performs the change, by way of the coupling 122. The controller 116 makes use of NVRAM 120 as a buffer to carry out the data change.

As another example, a user 156 may request data from storage 128. The request begins as a command sent to the controller 116 from a user computer 112 by way of the network 114. Controller 116 determines what block or blocks of data are required from spaces 152 and/or 154, retrieves the data by way of coupling 122 and routes the data to the user computer 112 over network 114. Again, NVRAM 120 is used as needed to carry out the retrieval. Operations initiated by user 156 that update data within or request data from storage 128 are collectively referred to as accessing, and either operation will be referred to as such hereafter.

I/O monitor 118 within controller 116 is configured to determine the respective sizes of spaces 150, 152 and 154, responsive to accessing. Furthermore, monitor 118 is configured to measure a rate at which access operations occur. Operations which write (i.e., add) new data to storage 128 require that controller 116 allocate space from free space 150 to space 152 and/or 154, as required by the RAID level to which the new data is written. Conversely, an operation that deletes data within spaces 152 and/or 154 results in new free space 150.

Because write operations to RAID level one require more space than do write operations to RAID level five—for a given size data block to be written—it is sometimes necessary to move data which is less frequently accessed from space 152 to space 154, so that new free space 150 is realized for other use. This data moving operation, known as makespace, becomes a higher priority as free space 150 is progressively depleted.

FIG. 3 illustrates a flowchart of performing the makespace operation as a background process, generally represented as numeral 200. A background process is one which is performed simultaneously with other operations, typically such that a system user 156 is unaware that the background process 200 is in progress. Definitions required for understanding process 200 shall be provided prior to describing the process itself:

d1) F is the quantity of free space 150 remaining in the storage 128, and is determined by the I/O monitor 118.

d2) U is a measure of the rate at which access operations are being performed (i.e., utilization) on storage 128 by users 156, and is determined by the I/O monitor 118. U is a dynamically changing value.

d3) Fth is a minimum quantity of free space 150 that is required to be kept in the storage 128. Fth is a user-definable variable (by way of interface 112), the value of which is stored within the controller 116.

d4) Uth(F) is a threshold value for comparison with U, and is a function of free space F. Uth(F) is calculated by the controller 116.

d5) Umin is a minimum value for Uth(F). Umin is a user-definable variable (by way of interface 112), the value of which stored within the controller 116.

Operation 200 begins with step 204, in which the I/O monitor 118 determines the free space 150 in storage 128. This value is designated as "F" in FIG. 3.

In step 205, F is compared to Fth. If F is greater than Fth, then F is determined to be sufficient and additional free space is not needed at this time, and the process 200 proceeds to step 226. If F is less than Fth, then the process 200 proceeds to step 206.

Then, in step 206, the array utilization threshold Uth(F) is calculated by controller 116. Function Uth(F) is predetermined, and is selected to satisfy the following criteria c1:

$$Uth(F) \Rightarrow 1; \text{ as } F \Rightarrow 0 \qquad \text{c1)}$$

In other words, the threshold utilization rate Uth(F) approaches one as free space F approaches zero. Many functions are available which satisfy criteria c1. The fundamental goal of criteria c1 is to establish a function for Uth(F) that equals or nearly equals one as the amount of free space 150, F, approaches zero as a result of adding data through write operations to storage 128.

One such candidate for function Uth(F) is:

$$Uth(F) = \exp(-\alpha F^2) \qquad \text{f1)}$$

where: $\alpha = [1/Fth^2] \ln(Umin)$

The function selected for Uth(F) is not critical for the purposes herein, provided that it is smooth, continuous, and satisfies criteria c1. Therefore, a vast number of satisfactory functions Uth(F) are possible.

Continuing on to step 208, Uth(F) is compared to Umin. If Uth(F) is greater than Umin, Uth(F) is left as calculated in step 206 and the process flow continues at step 220. If Uth(F) is less than or equal to Umin, then Uth(F) is set equal to Umin in step 210. In either event, process 200 continues with step 220, in which array utilization U is measured by I/O monitor 118.

Next, in step 222, U is compared to Uth(F). If U is less than Uth(F), then the utilization is below the threshold Uth.

This means that the rate at which the access operations are being performed is low enough that the makespace operation can create free space as a background operation. Under these conditions, the process 200 proceeds to step 224. If, however, U is greater than or equal to Uth(F), then the rate at which the access operations are being performed is high enough that performing the makespace operation in the background would adversely impact the response time (i.e., slowed response). Under these circumstances, the process 200 proceeds to step 226.

In step 224, additional free space 150 is created in storage 128. This operation, known as makespace, is accomplished through the selective moving of blocks of data from space 152 to space 154—that it, shifting the selected data from RAID level one to the more space-efficient RAID level five. In this way, needed free space 150 is ultimately reclaimed from the no-longer-needed space previously used to achieve full redundancy of the moved data. The selective moving of data in step 224 is performed by controller 116, utilizing NVRAM 118 as a buffer, as needed. FIG. 2 provides an illustration of this operation, as migrated data block 176 is taken from is original location 172 in space 152 and moved to space 154, by way of NVRAM 120. The data moving operation of step 224 is performed in the 'background', and other data access operations are performed as requested by users 156 concurrently with the makespace operation 224.

Once step 224 is complete, the process continues with wait period step 226. This wait period is determined by controller 116.

Wait step 226 may be static, or dynamically determined as a function of the most recently determined utilization rate U. Other methods of determining the wait period of step 226 are possible. Once step 226 is complete, process 200 returns to step 204 and repeats.

One goal of process 200 is to provide an adaptive control strategy to a RAID system so as to anticipate and avoid insufficient free space through the monitoring of RAID array access rates and available free space. Through this ongoing monitoring and data shifting process, user access to stored data is continuously provided while future storage space requirements are ensured.

In compliance with the statute, the invention has been described in language more or less specific as to structural and methodical features. It is understood, however, that the invention is not limited to the specific features shown and described, since the means herein disclosed comprise forms of putting the invention into effect. The invention is, therefore, claimed in any of its forms or modifications within the proper scope of the appended claims appropriately interpreted in accordance with the doctrine of equivalents.

What is claimed is:

1. A method of managing a RAID storage array, comprising:
   providing a RAID disk array having a RAID controller;
   receiving a plurality of commands from a user using the controller;
   accessing data within the disk array responsive to the plurality of commands using the controller;
   determining the amount of free space within the disk array using the controller;
   measuring a utilization rate of the accessing using the controller; and
   creating free space within the disk array, if the utilization rate is below a threshold utilization rate, responsive to the amount of free space, wherein the free space is not created if the utilization rate is greater than or equal to the threshold utilization rate whereby slowed response times that could occur under conditions of high utilization are avoided.

2. The method of claim 1, wherein the accessing comprises selectively storing data in and retrieving data from the array responsive to corresponding ones of the plurality of commands.

3. The method of claim 1, wherein the creating free space comprises selectively moving blocks of data within the disk array using the controller.

4. The method of claim 3, wherein the moving blocks of data comprises moving at least some blocks of data from a higher RAID level to a lower RAID level.

5. The method of claim 3, wherein at least a portion of the accessing and at least a portion of the creating free space occur at the same time.

6. A computer data storage system, comprising:
   a plurality of computer disks configured as an array; and
   a RAID controller respectively coupled to each of the computer disks within the array and configured to access data within the array and to determine the amount of free space within the array, wherein the controller is further configured to measure a utilization rate at which the array is accessed and to create free space within the array, if the utilization rate is below a threshold utilization rate, responsive to the free space, wherein the controller is further configured to create the free apace by selectively moving blocks of data to different RAID levels within the array, wherein the controller is further configured to access data within the array simultaneous with at least a portion of the creating free space, and wherein the free space is not created if the utilization rate is greater than or equal to the threshold utilization rate whereby slowed response times that could occur under conditions of high utilization are avoided.

7. The system in accordance with claim 6, wherein the controller is further configured to create the free space responsive to the determining and the measuring.

8. The system in accordance with claim 6, wherein the controller is further configured to create the free space responsive to the determining and the measuring and at least one pre-defined parameter.

9. The system in accordance with claim 6, wherein the controller is further configured to perform the determining and the measuring from time to time.

10. A computer data system, comprising:
    RAID storage means for storing data;
    means for determining a quantity of free space within the RAID storage means;
    means for reading and writing data within the RAID storage means responsive to respective commands;
    means for measuring a utilization rate of the reading and writing the data; and
    means for selectively moving the data within the RAID storage means responsive to the quantity determined by the determining means and the rate measured by the measuring means, such that free space is created within the RAID storage means, but wherein the data is not moved if the utilization rate is greater than or equal to a threshold utilization rate.

11. The system in accordance with claim 10, wherein the means for selectively moving includes a controller configured determine the quantity of free space end to measure the rate of the reading and writing the data and to selectively move the data responsive to the determining and the measuring.

12. The system in accordance with claim 11, wherein the controller is further configured selectively move the data responsive to utilization rate in a manner that reduces the impact of data movement on performance.

13. The system in accordance with claim 11, wherein the controller is further configured to perform the determining and the measuring and the selectively moving the data from time to time.

14. The system in accordance with claim 11, wherein the controller is further configured to selectively move the data in accordance with the functions $Uth(F)=\exp(-\alpha F^2)$ and $\alpha=[1/Fth^2]\ln(Umin)$, wherein $Uth(F)$ is a threshold value for comparison with the measured rate, F is the determined quantity of free space within the RAID storage means, Fth is a pre-defined minimum quantity of free space to be maintained within the RAID storage means, and Umin is a pre-defined minimum value for $Uth(F)$.

15. The system in accordance with claim 10, wherein the means for selectively moving includes means for selectively moving the data between different RAID levels within the RAID storage means.

16. The system in accordance with claim 10, wherein the means for reading and writing the data and the means for selectively moving are configured such that at least of portion of the reading and writing the data occurs simultaneously with the creating free space.

17. A data storage system, comprising:
a plurality of data storage elements configured as an array;
a RAID controller respectively coupled to each of the storage elements within the array and configured to selectively read data from and write data to the array and to determine the amount of free space within the array; and
a user interface coupled to the controller and configured to selectively issue a plurality of different commands respectively reading data from and writing data to the array by way of the controller, wherein the controller is further configured to measure a utilization rate at which the data is read from and written to the array by way of the user interface, and wherein the controller is further configured to create free space within the array from time to time responsive to the determining and the measuring, and wherein the creating the free space includes selectively moving blocks of data to different RAID levels within the array, and wherein the controller is further configured to read data from and write data to the array responsive to commands received by way of the user interface simultaneously with at least a portion of the creating the free space, the controller being configured to move the data in accordance with the functions $Uth(F)=\exp(-\alpha F^2)$ and $\alpha=[1/Fth^2]\ln(Umin)$, wherein $Uth(F)$ is a threshold value for comparison with the measured rate, F is the determined quantity of free space within the array, Fth is a pre-defined minimum quantity of free space to be maintained within the array, and Umin is a pre-defined minimum value for $Uth(F)$, wherein the data is not moved if the utilization rate is greater than or equal to $Uth(F)$.

* * * * *

UNITED STATES PATENT AND TRADEMARK OFFICE
CERTIFICATE OF CORRECTION

PATENT NO. : 7,337,269 B2
APPLICATION NO. : 10/264573
DATED : February 26, 2008
INVENTOR(S) : David Umberger et al.

It is certified that error appears in the above-identified patent and that said Letters Patent is hereby corrected as shown below:

Title Pg, Item (73), under "Assignee", in column 1, line 1, delete "Hewlett Packard" and insert -- Hewlett-Packard --, therefor.

In column 6, line 25, in Claim 6, delete "apace" and insert -- space --, therefor.

In column 6, line 62, in Claim 11, delete "end" and insert -- and --, therefor.

Signed and Sealed this

Fifth Day of August, 2008

JON W. DUDAS
*Director of the United States Patent and Trademark Office*